United States Patent [19]

Igarashi

[11] Patent Number: 5,140,697
[45] Date of Patent: Aug. 18, 1992

[54] SUBSCRIBER STATION OF SUBSCRIBER RADIO SYSTEM WHICH DO NOT INTERFERE WITH EACH OTHER

[75] Inventor: Hironobu Igarashi, Yokohama, Japan
[73] Assignee: Fujitsu Limited, Kawasaki, Japan
[21] Appl. No.: 468,672
[22] Filed: Jan. 23, 1990
[30] Foreign Application Priority Data Jan. 24, 1989 [JP] Japan .................................. 1-14701

[51] Int. Cl.$^5$ .............................................. H04B 1/40
[52] U.S. Cl. ...................................... 455/54.1; 370/29; 455/69
[58] Field of Search ................... 455/52, 54, 62, 63, 455/67-69, 70, 71, 75, 76, 115, 51, 34; 375/7, 109; 370/69.1, 95.3, 29, 95.1, 95.2, 105.1

[56] References Cited

U.S. PATENT DOCUMENTS

| | | | |
|---|---|---|---|
| 4,470,141 | 9/1984 | Takada . | |
| 4,577,316 | 3/1986 | Schiff . | |
| 4,672,889 | 6/1987 | Hewitt | 375/107 |
| 4,683,566 | 7/1987 | Sasaki | 370/100 |
| 4,709,402 | 11/1987 | Akerberg | 455/51 |
| 4,870,699 | 9/1989 | Garner et al. | 455/76 |
| 4,932,072 | 6/1990 | Toko | 455/76 |

FOREIGN PATENT DOCUMENTS 2095516 9/1982 United Kingdom .

Primary Examiner—Reinhard J. Eisenzopf
Assistant Examiner—Chi H. Pham
Attorney, Agent, or Firm—Nikaido, Marmelstein, Murray & Oram

[57] ABSTRACT

A subscriber station of a subscriber radio system, wherein a plurality of subscriber stations communicate with a base station through a time division multiplexed radio wave, includes an open-loop frequency control device for determination of a time slot to communicate with the base station. An oscillating frequency of a generator included in the open-loop is selected depending on a transmitting frequency from the base station from among a plurality of frequencies which can be set so that the time slot determined based on one of the plurality of frequencies does not overlap other time slots assigned to other subscriber stations.

5 Claims, 7 Drawing Sheets

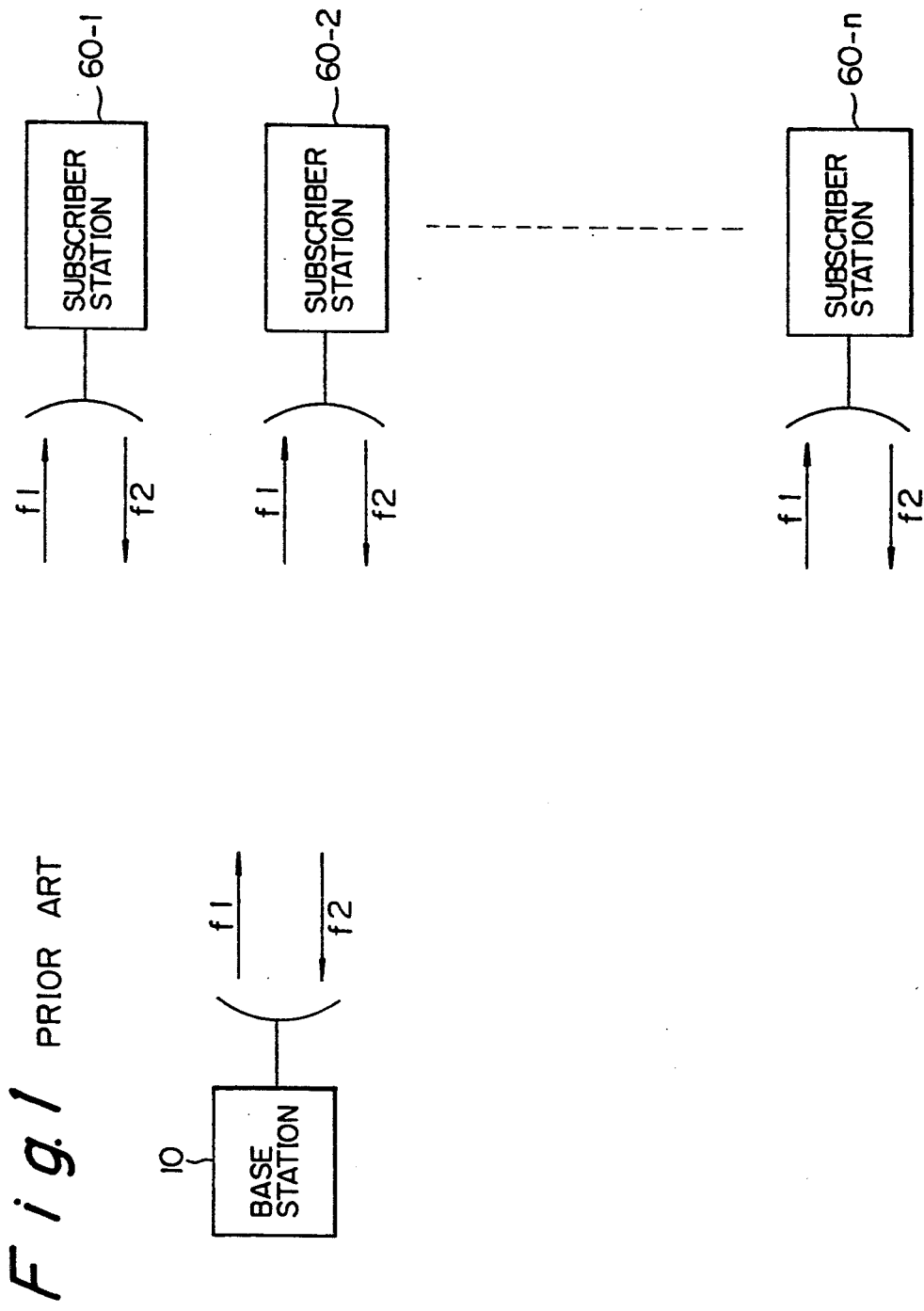

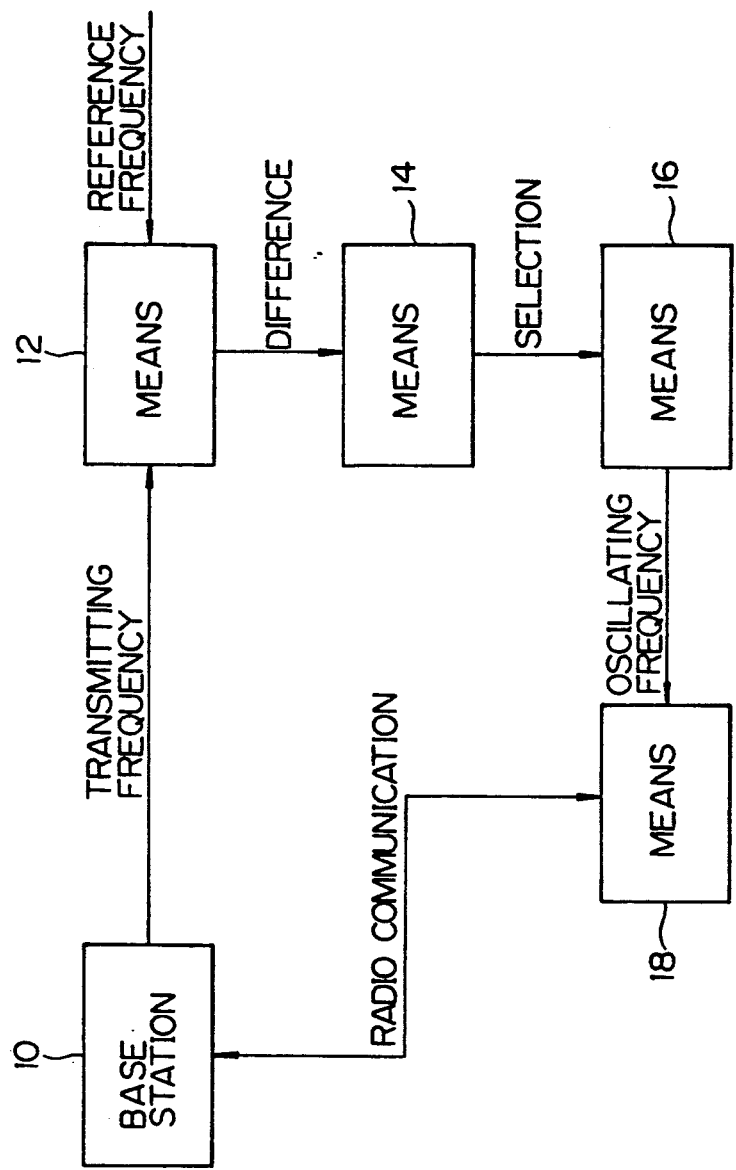

SUBSCRIBER STATION OF SUBSCRIBER RADIO SYSTEM WHICH DO NOT INTERFERE WITH EACH OTHER

BACKGROUND OF THE INVENTION

1. Field of the Invention

This invention relates to a subscriber station in a subscriber radio system, where a plurality of subscriber stations communicate with a base station through a time division multiplexed radio wave having a specific frequency.

This type of system is utilized, for example, in a radio communication system for specific subscribers using a portion of a public telephone line.

2. Description of the related Art

In the aforementioned system, each subscriber station is required to communicate with the base station within a time slot assigned to each subscriber station. Therefore, a signal having a frequency for determining the time slot has to be generated in the subscriber station.

If all the subscriber stations comprise frequency generators having high stability similarly to the base station, to perform stable radio communication within the assigned time slot, the cost of the subscriber station would be very high, so that the subscriber's expense and the cost of the whole system would be increased.

A system where a low-priced frequency generator is used in the subscriber station and a frequency of the generator is controlled depending on the transmitting frequency of the base station (i.e., down frequency), is employed.

In the conventional subscriber radio system, each subscriber station comprises a closed loop, for example, a PLL loop, which synchronously controls the frequency of the generator depending on the transmitting frequency of the base station. Since a received frequency in the subscriber station varies according to the state of a radio transmission path between the basic station and the subscriber station, the frequency of the generator varies following the variation of the received frequency. When the distance between the base station and the subscriber station is large, the influence on the state of the radio transmission path is so large that the closed loop is liable to become unstable in subscriber stations far from the base station. If the closed loop becomes unstable, the frequency of the generator varies extensively. Thus a transmitting radio wave from the subscriber station invades time slots of other subscriber stations to interfere with transmitting radio waves from the other subscriber stations, since the time slot occupied by a subscriber station is determined based on the frequency of the generator. Namely, an extreme oscillation in a subscriber station incurs disorder in not only the subscriber station itself, but also in the overall system.

SUMMARY OF THE INVENTION

An object of the present invention is to provide a subscriber station in a subscriber radio system, which can safely avoid extraordinary oscillation which interferes with normal radio communications by other subscriber stations.

In accordance with the present invention there is provided a subscriber station of a subscriber radio system which comprises a base station and a plurality of subscriber stations, characterized in that the subscriber station comprises means for estimating a difference between a transmitting frequency of the base station and a reference frequency, means for issuing a command to select a set frequency corresponding to the difference, means for selecting one frequency from among a plurality of set frequencies according to the command and for oscillating at the selected frequency, and means for radio communication with the base station within an assigned time slot determined based on the oscillation frequency.

BRIEF DES OF THE DRAWINGS

FIG. 1 is a block diagram showing a construction of a subscriber radio system;

FIG. 3 is a block diagram representing a basic construction of the subscriber station in the subscriber radio system, according to the present invention;

DESCRIPTION OF THE PREFERRED EMBODIMENTS

Before describing the preferred embodiments of the present invention, an explanation will be given of a conventional subscriber station comprising a closed loop in a subscriber radio system.

FIG. 1 shows a construction of a subscriber radio system. A closed loop, for example, a PLL loop is formed in each subscriber station 60-1, 60-2 ... 60-n to control the frequency of a frequency generator in each subscriber station 60-1, 60-2 ... 60-n, depending on a transmitting frequency of a base station (down frequency f1).

Figures 2A, 2B:
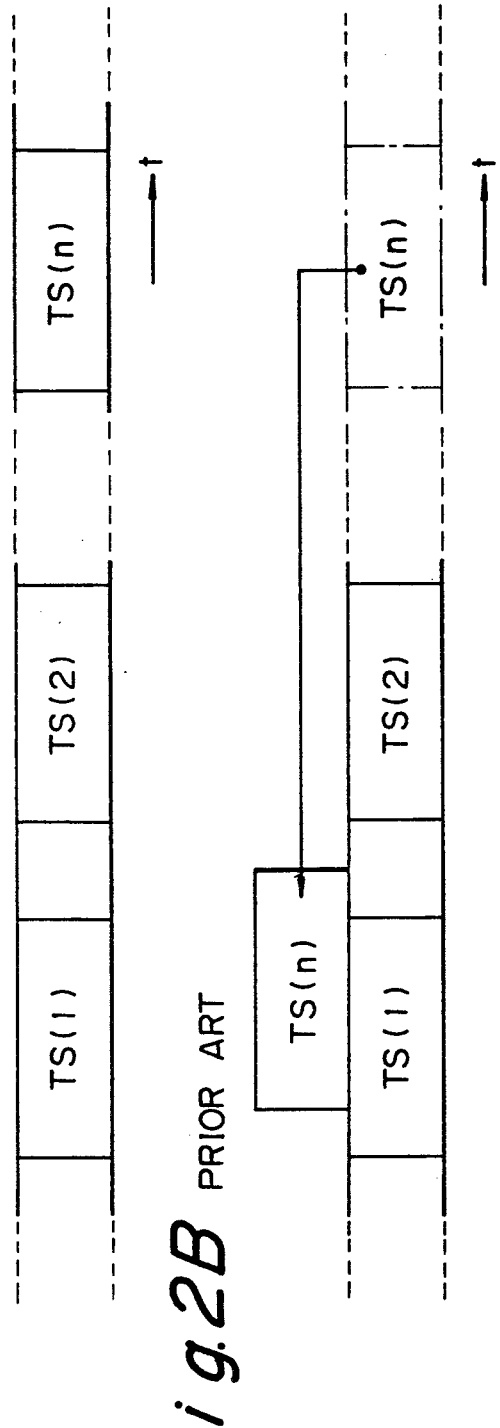
FIGS. 2A and 2B are diagrams representing time slots in the prior art.

FIGS. 2A and 2B represent time slots TS(1), TS(2) ... TS(n) assigned to the subscriber stations 60-1, 60-2 ... 60-n, respectively on a time axis t. If the closed loop in the subscriber station 60-n becomes unstable, the time slot TS(n) randomly shifts from the asigned position on the time axis t to invade other time slots TS(1) to TS(n-1) Thus, normal radio communications between the other subscriber stations and the base station are disrupted. As this extraordinary oscillation continues over a long time interval until lead-in of the loop has been completed, many other normal communications are disrupted.

FIG. 3 represents a basic construction of the subscriber station in the subscriber radio system, according to the present invention.

Means 12 estimates the difference between the transmitting frequency of the base station 10 and the reference frequency. Means 14 instructs means 16 to select a frequency from among a plurality of predetermined frequencies corresponding to the difference between the transmitting frequency of the base station 10 and the reference frequency. Means 16 selects a frequency from among a plurality of predetermined frequencies according to the instruction of the means 14, and generation of this frequency is performed in the means 16. Means 18 determines timing to transmit to the base station 10 according to the assigned time slot, based on the oscillating frequency, and communicates with the base station 10.

The transmission timing according to the assigned time slot is determined by the oscillating frequency of the means 16 which is selected from among the plurality of predetermined frequencies according to the instruction of the means 14.

The timing is controlled depending on the transmitting frequency of the base station 10 because the selection is carried out depending on the transmitting frequency. However, the range of the selection is limited within the predetermined frequencies.

Therefore, the movable range of the time slot assigned to the subscriber station can be limited so as not to overlap time slots of other stations. Thus, invading of other time slots assigned to other stations by the time slot assigned to one station is safely avoided.

Figure 4:
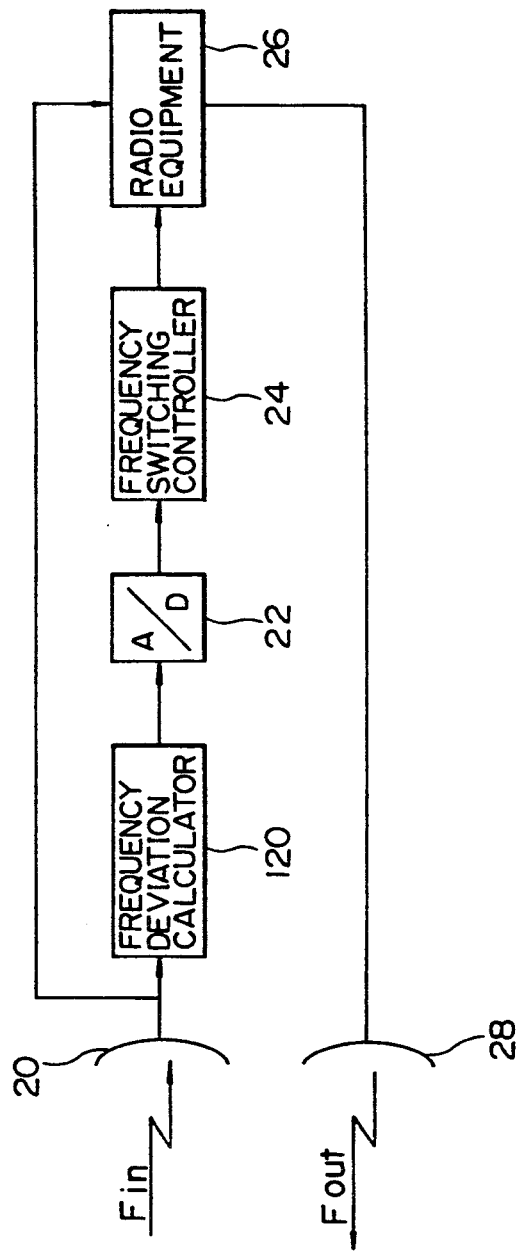
FIG. 4 is a block diagram representing a preferred embodiment of the present invention.

FIG. 4 shows a construction of a preferred embodiment of a subscriber station (60-k) according to the present invention.

The subscriber station comprises a receiving antenna 20, a frequency deviation calculator 120, an A/D converter 22, a frequency switching controller 24, radio equipment 26, and a transmitting antenna 28.

Figure 5:
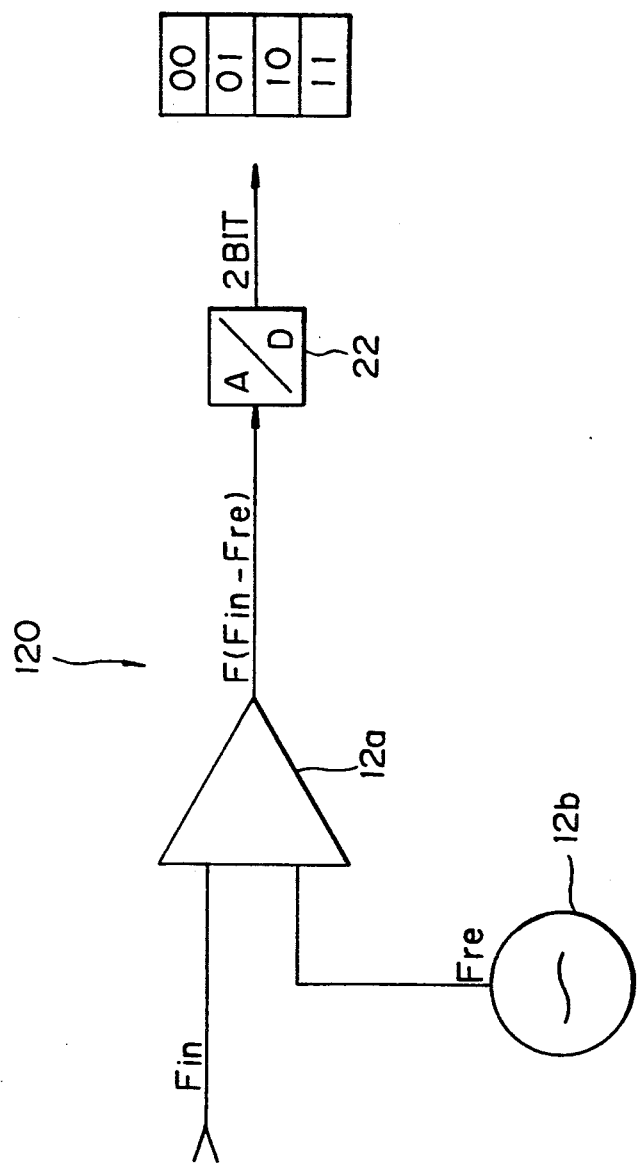
FIG. 5 is a circuit diagram showing an A/D converter 22 and the detailed construction of a frequency deviation calculator 12 shown in FIG. 4.
Figure 6:
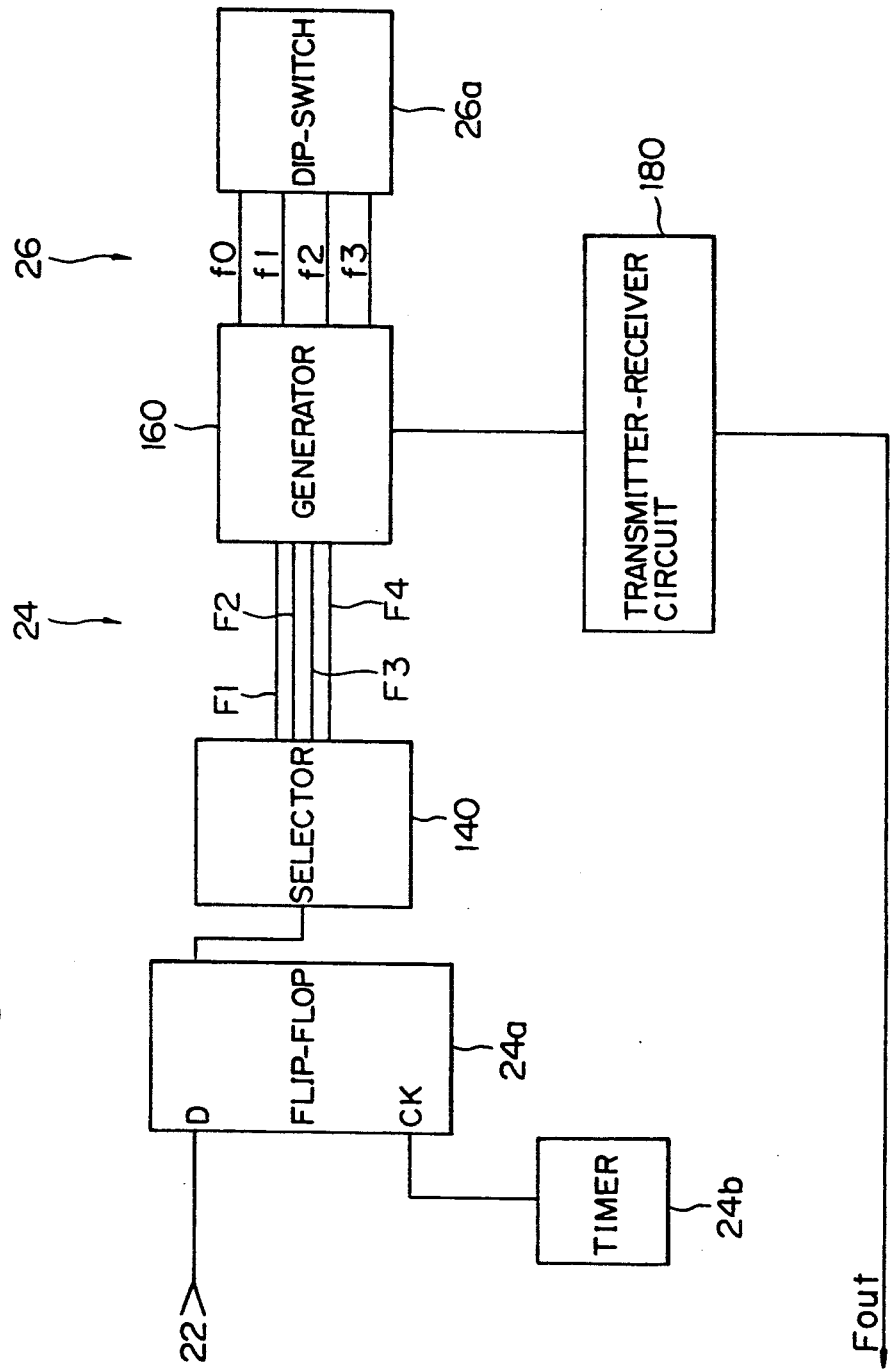
FIG. 6 is a circuit diagram showing a detailed construction of a frequency switching controller 24 and the radio equipment 26 shown in FIG. 4.

FIG. 5 shows the A/D converter 22 and a detailed construction of the frequency deviation calculator 120 in FIG. 4. FIG. 6 shows a detailed construction of the frequency switching controller 24 and the radio equipment 26.

Operation of the preferred embodiment of the present invention is described next referring to FIG. 4 to FIG. 6.

The radio wave transmitted from a base station is received in a receiving antenna 20 shown in FIG. 4. The received frequency Fin of the receiving antenna 20 is supplied to a frequency deviation calculator 120, wherein the received frequency Fin is input into a comparator 12a shown in FIG. 5.

A reference frequency Fre from a reference oscillator 12b is also input into the comparator 12a. The comparator 12a outputs a signal having a voltage proportional to a difference (Fin-Fre) between the received frequency Fin and the reference frequency Fre.

The output signal of the comparator 12a is supplied to the A/D converter 22 (FIG. 4 and FIG. 5). The A/D converter 22 outputs two-bit data of "0,0", "0,1" "1,0", or "1,1" corresponding to the voltage of the input signal, as shown in FIG. 5.

The two-bit data are supplied to a frequency switching controller 24, shown in FIG. 4. In the frequency switching controller 24, the two-bit data are input into a flip-flop 24a (FIG. 6). A time-up signal of a timer 24b is also input into the flip-flop 24a as a clock signal. The two-bit data from the A/D converter 22 are then sent to a selector 140 every time the time-up signal is input into the flip-flop 24a.

The selector 140 selects a switching control signal F1 when the two-bit data are "0,0", F2 when "0,1", F3 when "1,0", or F4 when "1,1". The switching control signal F1, F2, F3 or F4 is supplied to the radio equipment 26 shown in FIG. 4.

The radio equipment 26 comprises a generator 160 which outputs an oscillating signal having a frequency $f_0$, $f_1$, $f_2$ or $f_3$ which is determined by the state of the switching control signal F1, F2, F3 and F4, as shown in FIG. 6. The actual values of the frequencies $f_0$, $f_1$, $f_2$ and $f_3$ are set at a DIP-switch 26a.

The oscillating signal from the selector 160 is supplied to a transmitter-receiver circuit 180 comprised in the radio equipment 26. In the transmitter-receiver circuit 180, a transmitting signal having a frequency $f_{out}$ determined based on the frequency $f_0$, $f_1$, $f_2$ or $f_3$, is formed.

The transmitting signal is transmitted through the transmitting antenna 28 shown in FIG. 4 within a time slot determined based on the oscillating frequency of the generator 160.

Figure 7:
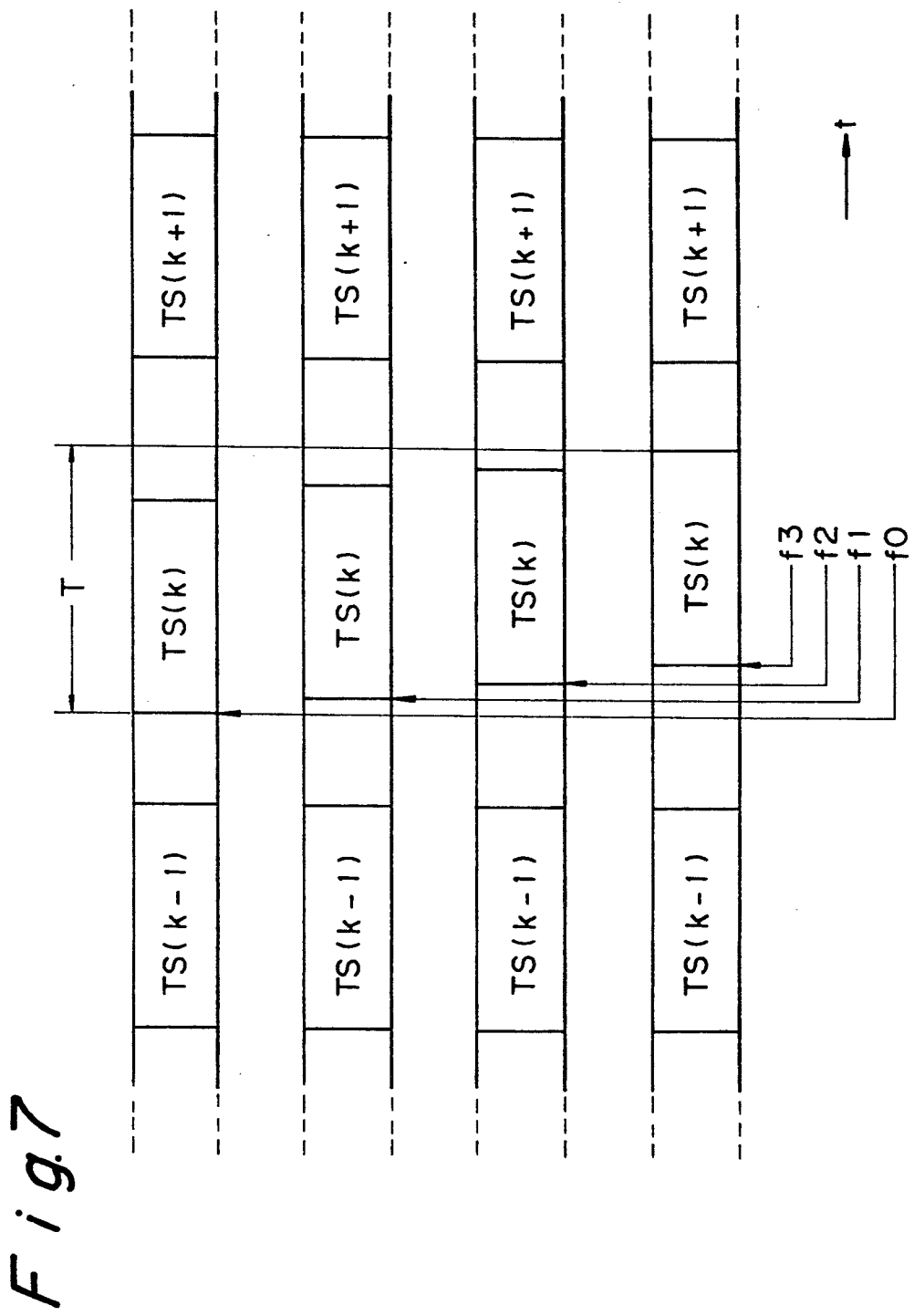
FIG. 7 is a diagram for explanation of an operation of the preferred embodiment of the present invention.

FIG. 7 represents time slots determined in the aforementioned subscriber station. The oscillating frequencies $f_0$, $f_1$, $f_2$ and $f_3$ are set so that a time slot TS(K) corresponding to the frequency $f_0$, $f_1$, $f_2$ or $f_3$ falls into an allowed interval T which does not overlap neighboring time slots TS(K-1) or TS(K+1) assigned to other subscriber stations, as shown in FIG. 7.

To this end, even if the receiving frequency $f_{in}$ of the transmitting radio wave of the base station is disordered due to quick or extremely large fluctuation of the frequency of the transmitting frequency from the base station (down frequency $f_1$), or due to instantaneous interruption of the transmitting radio wave, the frequency $f_0$, $f_1$, $f_2$ or $f_3$ is supplied to the transmitter-receiver circuit 18 from the generator 160 in spite of the disordered receiving frequency $f_{in}$, so that the moving range of the time slot TS(K) of the subscriber station is limited within the allowed interval T.

Furthermore, even if the neighboring time slot TS(k-1) or TS(k+1) assigned to another subscriber station moves within its allowed interval, the time slot TS(k) does not overlap the time slot TS(k-1) or TS(K+1) assigned to other subscriber stations.

As mentioned above, in the preferred embodiment of the present invention, the oscillating frequency of each subscriber station is selected from among a plurality of predetermined frequencies corresponding to the fluctuation of the down frequency within a range where the time slot of the subscriber station does not overlap another time slot of another subscriber station, so that communication interference with other stations by the radio wave of the station can be avoided in spite of any fluctuation of the down frequency.

Therefore, a communication interruption caused by abnormal fluctuation of the down frequency is confined to the subscriber station itself and extension to other subscriber stations is safely prevented.

Accordingly, a system having high reliability against the fluctuation of the frequency of the transmitting radio wave can be constructed.

Furthermore, the oscillation frequency of the subscriber station is controlled by an open-loop according to the transmitting frequency of the base station, so that the circuit of the subscriber station can be more simply constructed than by a closed-loop. Thus the cost of constructing the system can be further reduced.

Additionally, as the flip-flop 24a and the timer 24b are provided in a preceding stage of the selector 140, the fluctuation of the received frequency is relaxed, so that quick switching of the oscillation frequency which is liable to lead to malfunction is avoided As mentioned above, in accordance with the present invention, since a plurality of frequencies is predetermined so that a time slot does not overlap other time slots assigned to other stations, and one of the frequencies is selected according to the fluctuation of the down frequency, communication interference with other stations by one station can be always avoided in spite of the fluctuation of the down frequency. Therefore, an extension of a communication interruption in a subscriber station caused by abnormal fluctuation of the down frequency to other subscriber stations can be safely prevented, so that a system having very high reliability against the fluctuation of the frequency of the transmitting radio wave can be inexpensively constructed.

I claim:

1. A subscriber station of a subscriber radio system which comprises a base station and a plurality of subscriber stations, each subscriber station comprising:
   estimating means for estimating a difference between a transmitting frequency of said base station and a reference frequency;
   command means for issuing a command to select one frequency corresponding to said difference;
   selecting and oscillating means for selecting said one frequency from among a plurality of set frequencies according to said command and for oscillating at said selected frequency; and
   transmitting means for radio communication with said base station within an assigned time slot determined based on said oscillation frequency.

2. A subscriber station as claimed in claim 1, wherein said command means comprises
   a timer for periodically outputting a time-up signal,
   a holding means for holding said difference when said time-up signal is input, and
   a selector for selecting said command among a plurality of commands according to said held difference.

3. A subscriber station as claimed in claim 2, wherein said estimating means comprises
   a reference oscillator which outputs a reference frequency,
   a comparator which outputs a signal having a voltage proportional to a difference between said transmitting frequency and said reference frequency, and
   an A/D converter which outputs a digital signal consisting of a plurality of bits representing the magnitude of said voltage.

4. A subscriber station as claimed in claim 3, wherein said selective and oscillating means comprises
   a DIP-switch to set a plurality of frequency values, and
   a generator which selects one frequency value from among said plurality of frequency values according to said command and oscillates at said selected frequency value.

5. A subscriber station as claimed in claim 4, wherein said transmitting means is a transmitter-receiver circuit which radio communicates with said base station within said assigned time slot determined based on said oscillation frequency of said generator.

* * * * *